United States Patent
Silvis et al.

(10) Patent No.: US 8,707,903 B2
(45) Date of Patent: Apr. 29, 2014

(54) ANIMAL ENCLOSURE FLOOR SEAL

(75) Inventors: Gary Silvis, Sardinia, OH (US);
Gregory N. Taylor, Anderson, OH (US);
Jeffrey J. Ballman, Washington Court House, OH (US)

(73) Assignee: The Mason Company, LLC, Leesburg, OH (US)

( * ) Notice: Subject to any disclaimer, the term of this patent is extended or adjusted under 35 U.S.C. 154(b) by 288 days.

(21) Appl. No.: 12/930,897

(22) Filed: Jan. 19, 2011

(65) Prior Publication Data

US 2012/0180732 A1    Jul. 19, 2012

(51) Int. Cl.
*A01K 1/03* (2006.01)
*A01K 1/01* (2006.01)
*A01K 31/04* (2006.01)
*A01K 31/06* (2006.01)
*A01K 1/00* (2006.01)

(52) U.S. Cl.
USPC ........... 119/480; 119/416; 119/479; 119/525; 119/452

(58) Field of Classification Search
USPC .............. 49/476.1, 475.1, 470; 119/479, 480, 119/509, 525, 416, 452
See application file for complete search history.

(56) References Cited

U.S. PATENT DOCUMENTS

| | | | | |
|---|---|---|---|---|
| 2,949,651 A | * | 8/1960 | Hill | 49/493.1 |
| 3,273,287 A | * | 9/1966 | Pease, Jr. | 49/468 |
| 3,448,543 A | * | 6/1969 | Multer | 49/470 |
| 3,854,246 A | * | 12/1974 | McAllister | 49/470 |
| 4,006,562 A | * | 2/1977 | Belanger et al. | 49/380 |
| 4,130,972 A | | 12/1978 | Varlonga | |
| 4,430,832 A | | 2/1984 | Kaiser et al. | |
| 5,174,065 A | * | 12/1992 | Schlicht | 49/489.1 |
| 5,396,734 A | * | 3/1995 | Frey | 49/469 |
| 6,253,493 B1 | * | 7/2001 | Sauve | 49/470 |
| 6,374,545 B1 | * | 4/2002 | Baczuk | 49/470 |
| 7,062,881 B2 | * | 6/2006 | Rissone | 49/467 |

FOREIGN PATENT DOCUMENTS

| | | |
|---|---|---|
| DE | 29812847 U1 | 11/1998 |
| EP | 0658661 A1 | 6/1995 |
| EP | 2101013 A2 | 9/2009 |
| FR | 1365217 A | 6/1964 |
| FR | 1467431 A | 1/1967 |
| GB | 2276641 A | 10/1994 |
| GB | 2366506 A | 3/2002 |
| GB | 1200828.0 | 5/2012 |
| GB | 2487476 A | 7/2012 |
| GB | 1200828.0 | 5/2013 |

OTHER PUBLICATIONS

Unknown, [photo], http://www.lglacp.com/modular_kennel_system-photo-four.jpg, Oct. 16, 2009, LGL Animal Care Products, Inc., College Station, TX, USA.
Unknown, Modular Kennel System, http://www.lglacp.com/ modular_kennel_system.htm, last modified: Dec. 2, 2009, ® 2000, 2009 LGL Animal Care Products, Inc., College Station, TX, USA.

* cited by examiner

*Primary Examiner* — Monica Williams
(74) *Attorney, Agent, or Firm* — Anthony P. Filomeua; Taft Stettinius & Hollister, LLP.

(57) ABSTRACT

Devices, apparatuses, systems and/or methods related to animal enclosures. Specifically, the disclosed devices, apparatuses, systems and/or methods relate to animal enclosure floor seal systems that may be coupled to an animal enclosure wall and may impede, restrict and/or reduce debris from entering or exiting the animal enclosure. In this manner, likelihood of contamination of the animal enclosure may be reduced.

20 Claims, 6 Drawing Sheets

ANIMAL ENCLOSURE FLOOR SEAL

BACKGROUND

Animal enclosures such as cages are generally intended to keep multiple animals enclosed as safely and effectively as possible. In many environments, such as kennels and animal boarding environments, multiple animal enclosures may be organized next to each other (e.g., configured in rows). An issue with most animal enclosures is how well an enclosure wall adheres to the floor, as the floors often contain imperfections. Imperfections such as slight waves, channels, dips and the like, make it difficult for an enclosure wall to touch and/or adhere to the floor.

When an enclosure wall does not touch and/or adhere to the floor, gaps may be created that allow debris to travel out of the animal enclosure into another animal enclosure or into a community area, or into the animal enclosure from another animal enclosure or a community area. This may allow animal waste (e.g., feces, urine), food, bacteria and/or other debris to travel through the gaps. When debris travels under an enclosure wall to another animal enclosure or from another animal enclosure, cross-contamination may occur. Such cross-contamination may lead to spreading of disease, bacteria and/or odor.

It is desired that animal enclosures impede, restrict and/or reduce debris flow from inside an animal enclosure to an area outside the animal enclosure. Further, it is desired that animal enclosures impede, restrict and/or reduce debris flow from outside an animal enclosure to inside the animal enclosure.

Therefore, it is be desirable to have an animal enclosure floor seal system that decreases the likelihood of contamination of an animal enclosure.

SUMMARY OF THE DISCLOSURE

This disclosure is drawn to devices, apparatuses, systems and/or methods related to animal enclosures. Specifically, the disclosed devices, apparatuses, systems and/or methods relate to animal enclosure floor seal systems that may be coupled to an animal enclosure wall and may impede, restrict and/or reduce debris from entering or exiting the animal enclosure. In this manner, likelihood of contamination of the animal enclosure may be reduced.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION

Figure 1:
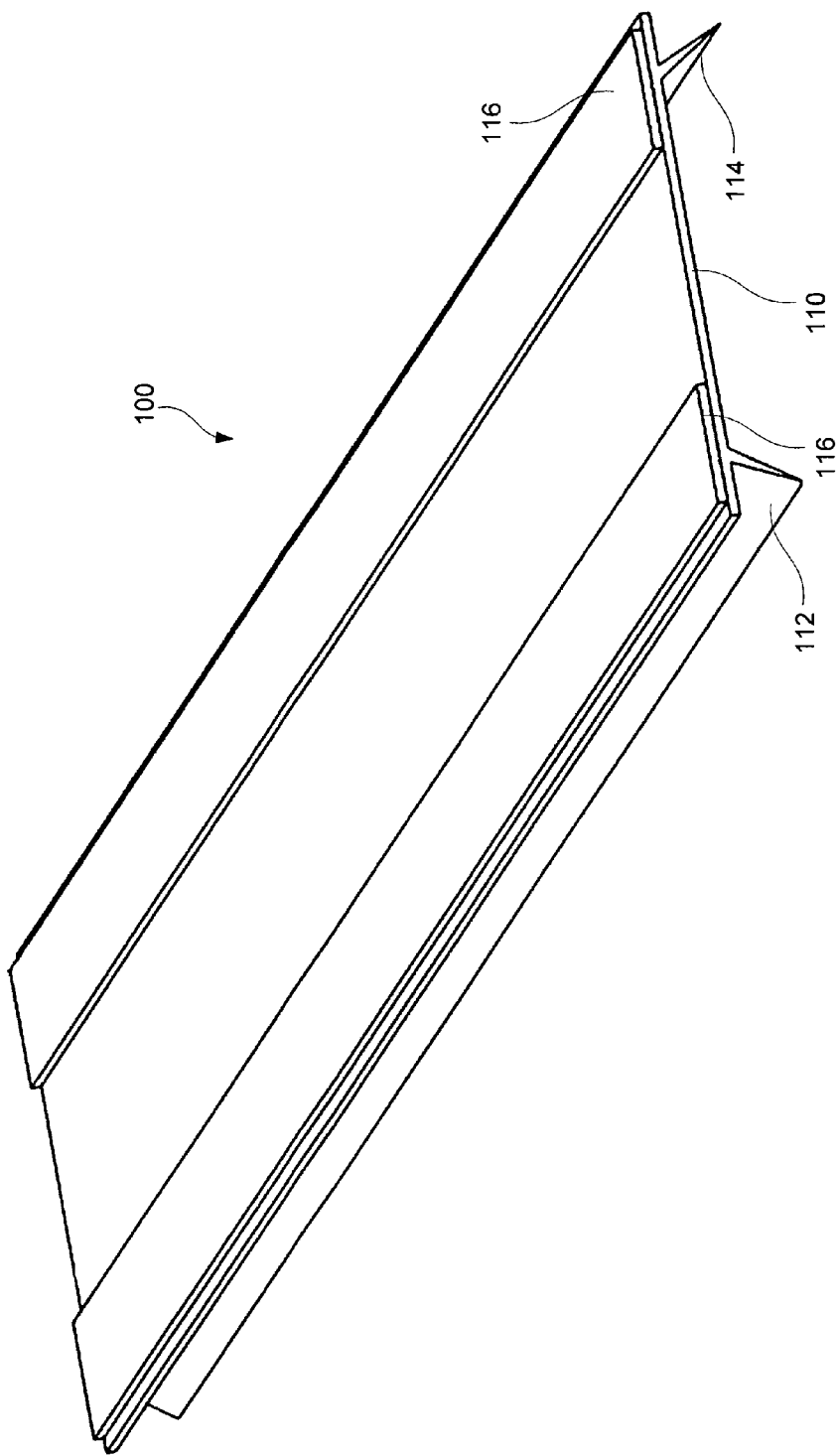
FIG. 1 is a diagram depicting an example embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

In an example embodiment, as generally depicted in FIG. 1, an animal enclosure floor seal 100 is provided. The floor seal 100 may be adapted to impede, restrict and/or reduce debris flow (e.g., liquids, solids, gases and/or bacteria) to and/or from an animal enclosures having one or more wall. An example floor seal 100 may include a mounting portion 110 and barrier portion(s) 112, 114. The mounting portion 110 may be coupled to a bottom portion of the wall. Barrier portions 112, 114 may be coupled to the mounting portion 110 such that each barrier portion 112, 114 extends toward the floor of the animal enclosure.

In some embodiments, the mounting portion 110 may be substantially the same length as the wall. In some examples, the mounting portion 110 may include one or more extension 116. Extensions 116 may be used to couple the mounting portion 110 to the bottom portion of the wall. Extensions 116 may run the entire length of the mounting portion 110, or may run shorter or longer than the length of the mounting portion 110. Some animal enclosures may include a wall where the bottom portion thereof includes an extrusion for receiving the mounting portion 110.

Figure 2:
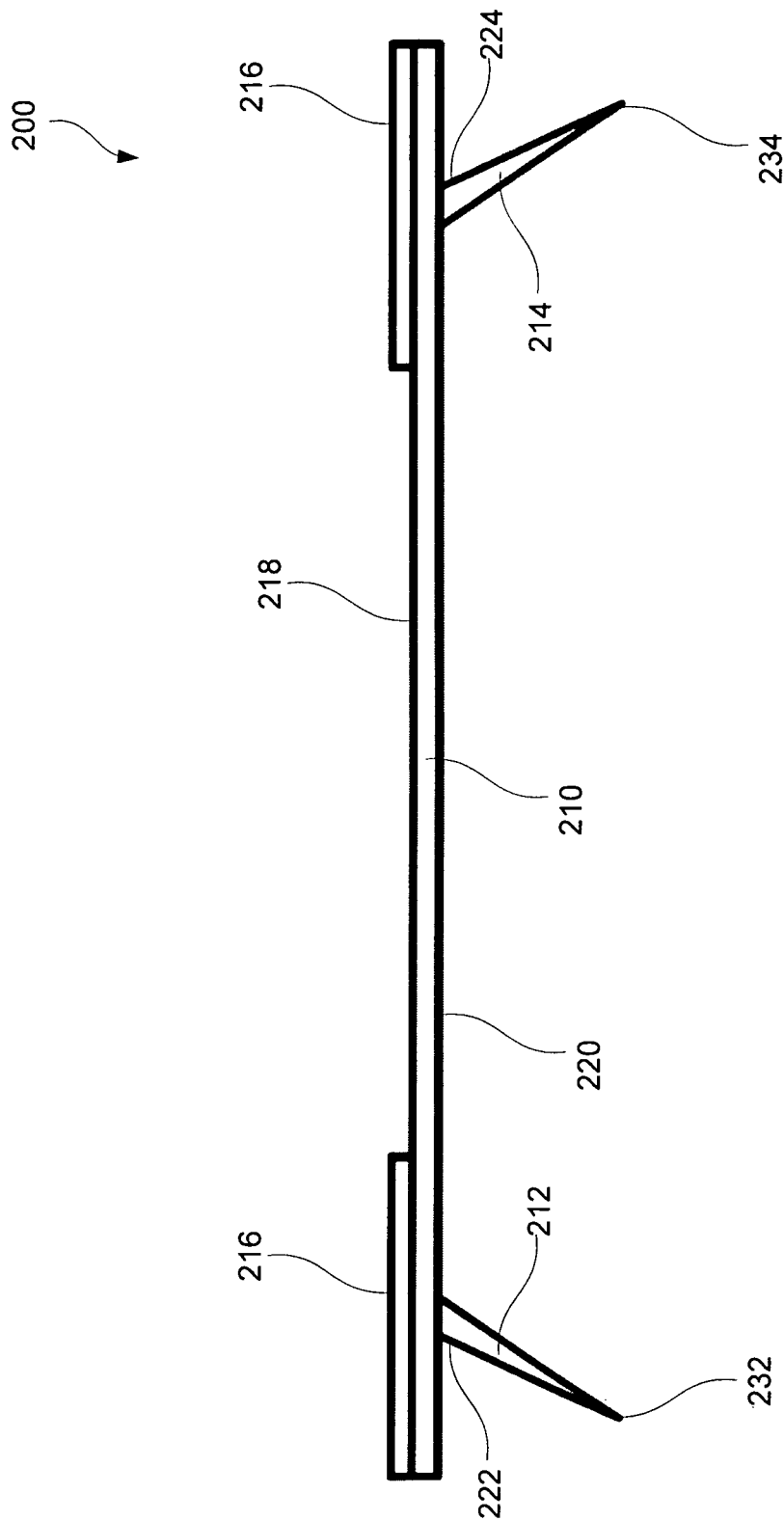
FIG. 2 is a diagram depicting another example embodiment.
Figure 3:
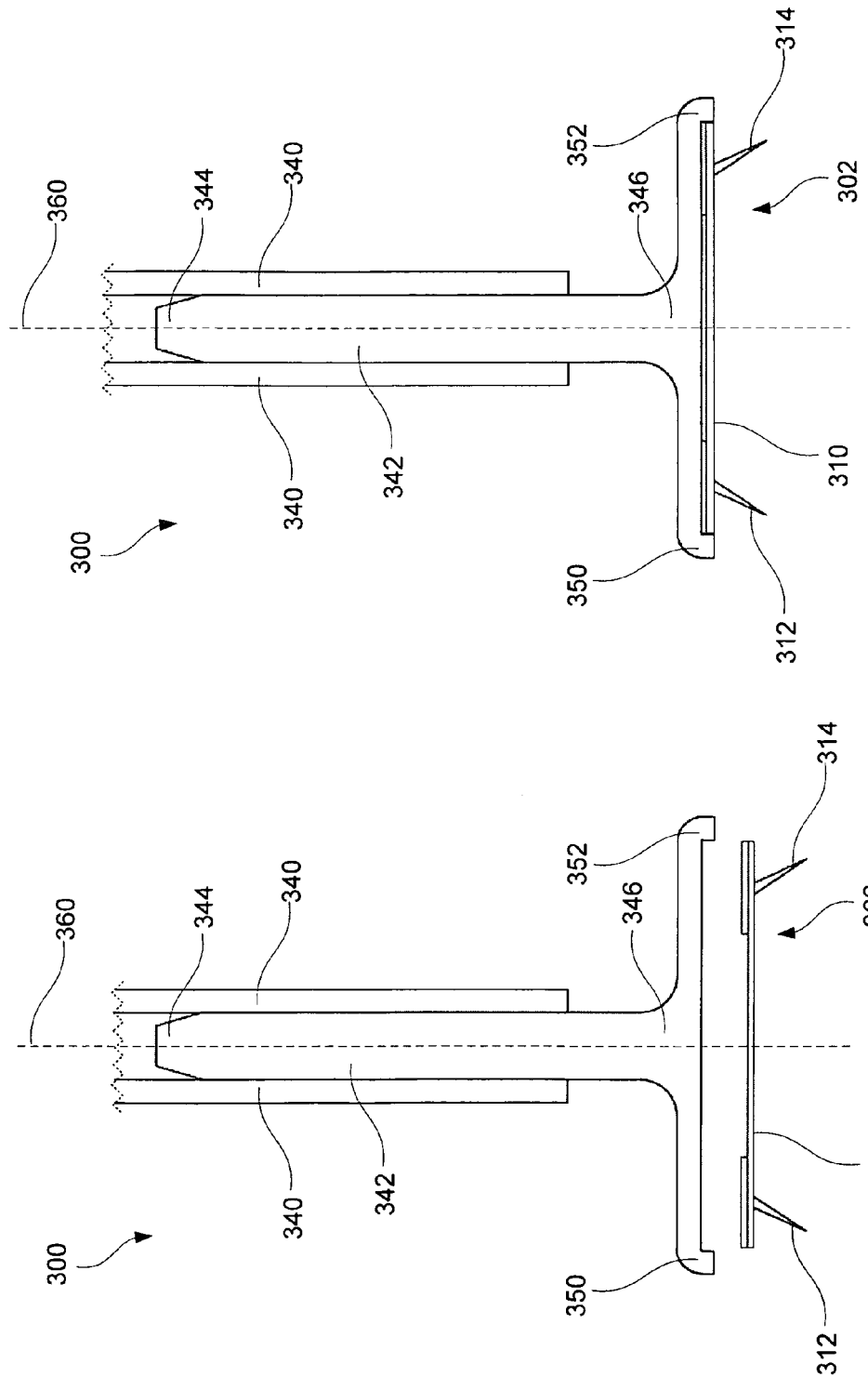
FIGS. 3A and 3B are diagrams depicting another example embodiment.
Figure 4:
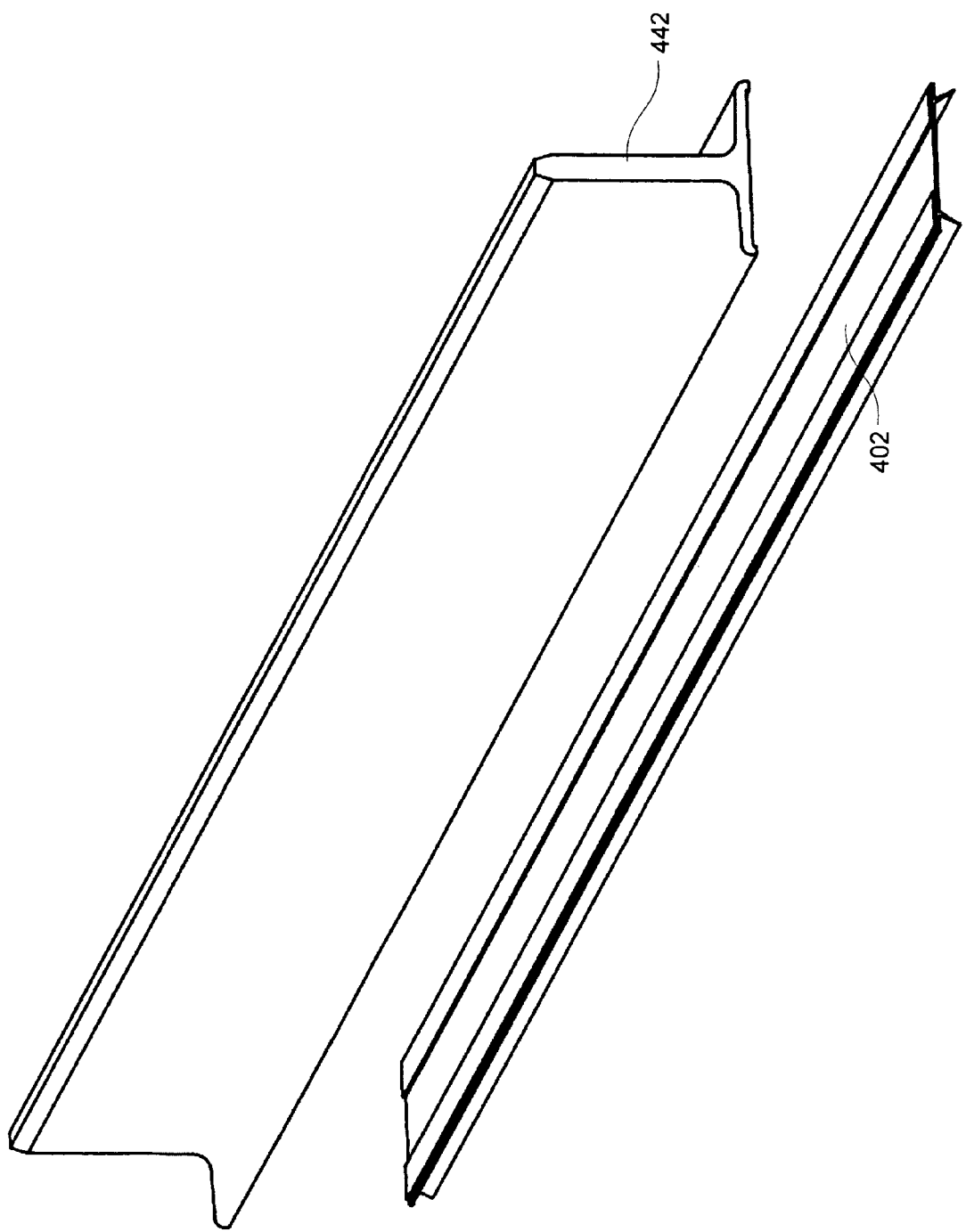
FIG. 4 is a diagram depicting another example embodiment.
Figure 5:
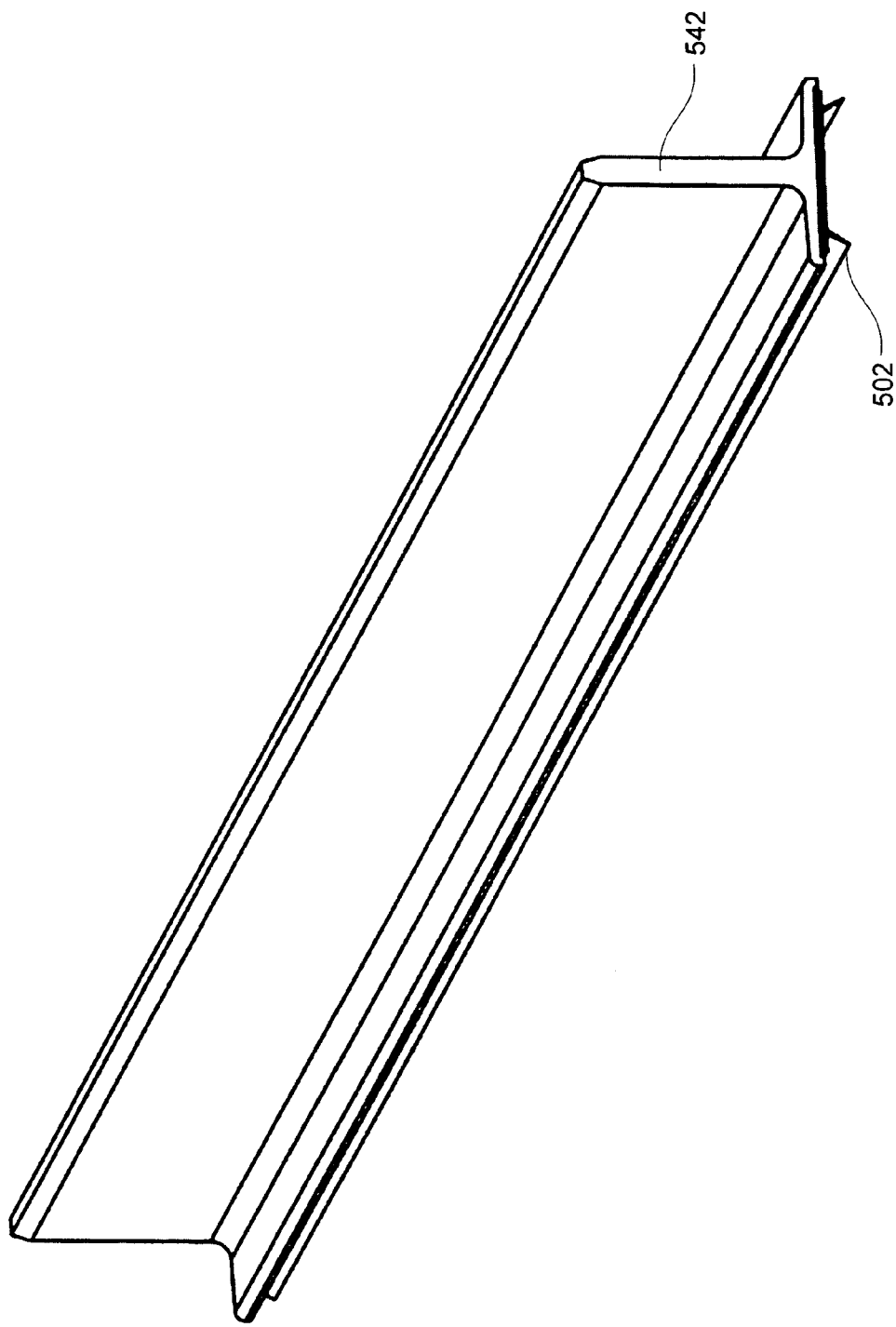
FIG. 5 is a diagram depicting another example embodiment.

In some examples, barrier portions 112, 114 may be coupled to the mounting portion 110 such that the mounting portion 110 and barrier portions 112, 114 are integrated as a single unit (as depicted in FIGS. 1, 4 and 5, for example). In some examples, barrier portions 112, 114 may be coupled to the mounting portion 110 such that the mounting portion 110 and barrier portions 112, 114 are separate elements coupled together (as depicted in FIGS. 2, 3A and 3B, for example). Example coupling mechanisms may include glues or other adhesives, fusing, mechanical couplers (e.g., nails, screws) and/or other similar mechanisms for coupling.

In some examples, barrier portions 112, 114 may include a first barrier portion 112 and a second barrier 114. The first barrier portion 112 may extend from the mounting portion 110 toward the interior of the animal enclosure (e.g., the area configured to enclose an animal), while the second barrier portion 114 may extend from the mounting portion 110 toward the exterior of the animal enclosure (e.g., the area outside the animal enclosure, which may include a community area or a second animal enclosure). In this manner, as generally depicted in FIG. 1, the first barrier portion 112 and the second barrier portion 114 may appear to be angled away from the wall or a plane coplanar with the wall (not shown in FIG. 1). In some examples, the first barrier portion 112 and the second barrier portion 114 may be angled toward the wall or a plane coplanar with the wall.

In some example embodiments, as generally depicted in FIG. 2, an animal enclosure floor seal 200 for reducing debris flow between an animal enclosure wall and an animal enclosure floor is provided. FIG. 2 depicts a cross-sectional view of example animal enclosure floor seal 200. The floor seal 200 may include a mounting strip 210 and a first barrier flange 212. The mounting strip 210 may include a wall-facing surface 218 and a floor-facing surface 220. The wall-facing surface 218 may be coupled to the animal enclosure wall (not shown). The first barrier flange 212 may include a first end 222 and a second end 232. The first end 222 may be coupled to the floor-facing surface 220 of the mounting strip 210. In some examples, the floor seal 200 may also include a second barrier flange 214 having a third end 224 and a fourth end 234. The third end 224 may be coupled to the floor-facing surface 220 of the mounting strip 210.

In some examples, the first barrier flange 212 and the second barrier flange 214 may be coupled to the mounting strip 210 such that the first barrier flange 212 opposes the second barrier flange 214. In some examples, the first barrier flange 212 and/or the second barrier flange 214 are angled away from a plane that is coplanar with the animal enclosure wall (not shown). In some examples, the second end 232 and the fourth end 234 may be angled away from a plane that is coplanar with the animal enclosure wall (not shown). In some examples, the second end 232 and the fourth end 234 may be farther from a plane that is coplanar with the animal enclosure wall than the first end 222 and the third end 224, respectively.

In another example embodiment, as generally depicted in FIGS. 3A and 3B, an animal enclosure floor seal system 300 is provided. FIGS. 3A and 3B depict cross-sectional views of example animal enclosure floor seal system 300. The seal system 300 may be adapted to impede, restrict and/or reduce debris flow (e.g., liquids, solids, gases and/or bacteria) between animal enclosures that share a wall 340. An example floor seal system 300 may include an extrusion 340 and a floor seal 302. An example extrusion 342 may have a first end 344 and a second end 346. The extrusion may be coupled to the wall 340 at the first end 344. The floor seal 302 may be coupled to the second end 346 of the extrusion 342. The floor seal 302 may include a mounting strip 310 and barrier flange(s) 312, 314. The mounting strip 310 may include an extrusion-facing surface and a floor-facing surface. The extrusion-facing surface of the mounting strip 310 may be coupled to the second end 346 of the extrusion 342. The barrier flange 312, 314 may be coupled to the floor-facing surface of the mounting strip 310.

In some examples, the extrusion 342 may have a substantially inverted T-shaped cross-section, as depicted in FIGS. 3A and 3B, for example. In some embodiments, the extrusion 342 may have other cross-sectional shapes and/or dimensions. In some examples, the extrusion 342 may also include two floor-facing flanges 350, 352. In some examples, the mounting strip 310 may be coupled to the second end 346 of the extrusion 342 between the two floor-facing flanges 350, 352.

In some examples, the extrusion 342 and/or the mounting strip 310 may be substantially the same length as the wall 340 (e.g., the distance between one end of the wall 340 to the other end of the wall 340). In some examples, the barrier flange(s) 312, 314 may be slanted outwardly from a plane 360 that is coplanar with the wall 340. In some examples, an angle between the floor-facing surface and the barrier flange(s) 312, 314 may be less than ninety degrees. Some examples provide that an angle between the floor-facing surface and the barrier flange(s) 312, 314 may be greater than or equal to ninety degrees.

Figure 6:
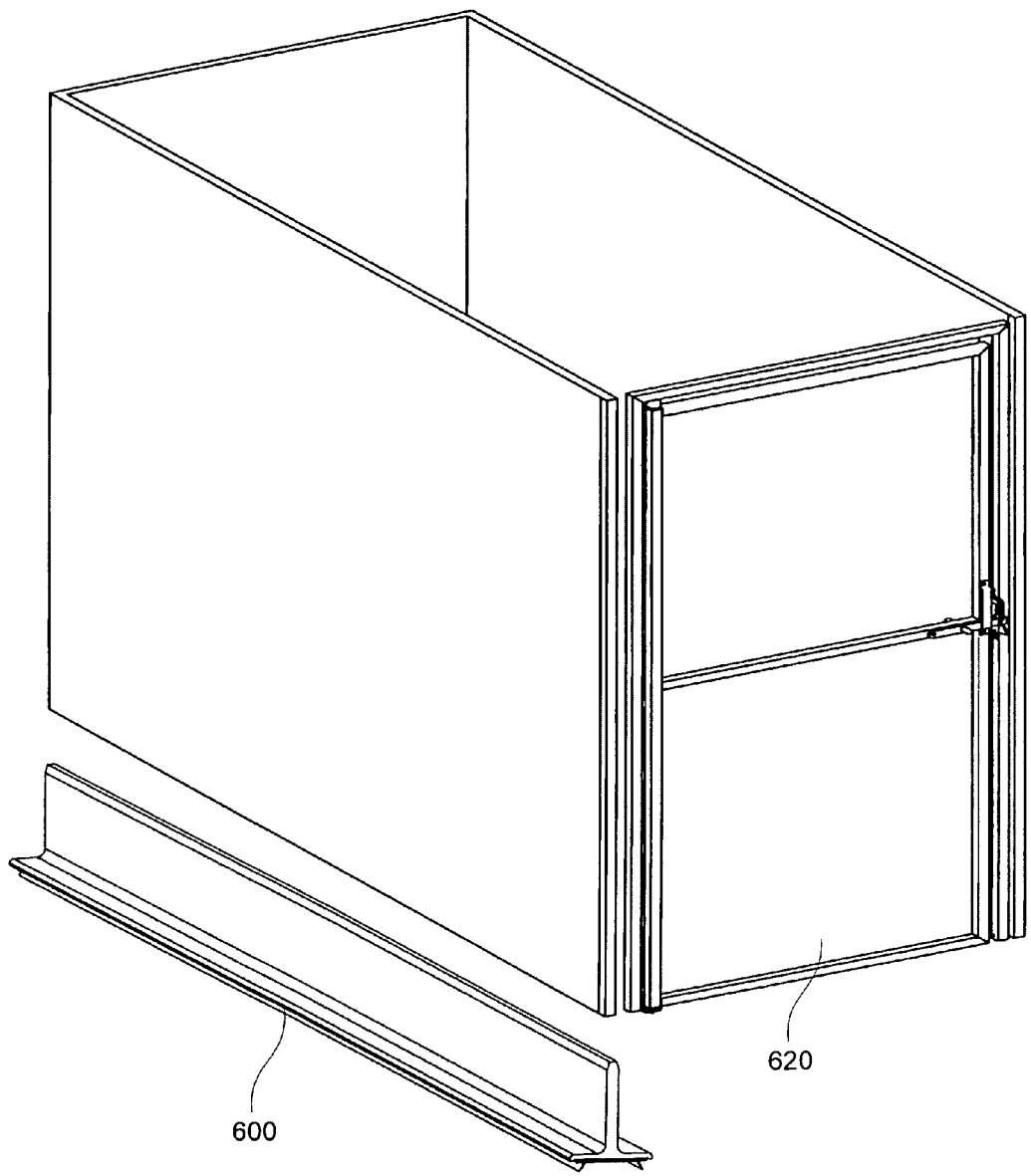
FIG. 6 is a diagram depicting yet another example embodiment.

FIG. 4 depicts an exploded perspective view of an example floor seal 402 and example extrusion 442. FIG. 5 depicts a perspective view of an example floor seal 502 engaging an example extrusion 542. FIG. 6 depicts an exploded perspective view of an example floor seal system 600 and an example animal enclosure 620. For simplicity, FIG. 6 depicts an embodiment in which only one animal enclosure wall has a corresponding floor seal system. It is within the scope of the present disclosure that any number of walls has a corresponding floor seal system, including, without limitation, one wall, two walls, three walls, four walls, all walls and/or less than all walls.

It should be noted that the embodiments described herein may be of any dimension and/or shape, and shall not be limited by example dimensions and/or example shapes depicted the FIGS.

Further, embodiments (or portions thereof) described herein may be constructed of any material such as, without limitation, plastics, rubbers, composites, metals and/or other materials. For example, some embodiments may include barrier portions or barrier flanges made of flexible rubber or plastic, while some embodiments may include relatively rigid plastic barrier portions or barrier flanges.

Following from the above description and invention summaries, it should be apparent to those of ordinary skill in the art that, while the methods and apparatuses herein described constitute exemplary embodiments of the present invention, it is to be understood that the inventions contained herein are not limited to the above precise embodiment and that changes may be made without departing from the scope of the invention. Likewise, it is to be understood that it is not necessary to meet any or all of the identified advantages or objects of the invention disclosed herein in order to fall within the scope of the invention, since inherent and/or unforeseen advantages of the present invention may exist even though they may not have been explicitly discussed herein.

What is claimed is:

1. A kennel floor seal for impeding debris flow to and from a kennel, the kennel floor seal comprising:

a mounting portion positioned between a bottom portion of a kennel wall and a kennel floor, the mounting portion having a length, the mounting portion including a wall-facing surface and a floor-facing surface, a wall plane coplanar with the kennel wall extending along the length of the mounting portion creating an interior side of the mounting portion on one side of the wall plane and an exterior side of the mounting portion on the opposite side of the wall plane;

a first barrier portion coupled to the mounting portion and extending along the length of the floor-facing surface of the mounting portion proximate the interior side of the mounting portion;

a second barrier portion coupled to the mounting portion and extending along the length of the floor-facing surface of the mounting portion proximate the exterior side of the mounting portion; and an extrusion configured to couple the mounting portion to the kennel wall, the extrusion including a first receiver to couple to the wall-facing surface of the mounting portion and a second receiver to couple to the kennel wall.

2. The kennel floor seal of claim 1, wherein the first barrier portion is acutely angled with respect to the mounting portion to extend away from the wall plane in a first direction and the second barrier portion is acutely angled with respect to the mounting portion to extend away from the wall plane in a second direction, the second direction being opposite the first direction.

3. The kennel floor seal of claim 1, wherein the extrusion comprises a T-shaped vertical cross-section.

4. The kennel floor seal of claim 1, wherein the mounting portion is substantially the same length as the kennel wall.

5. The kennel floor seal of claim 1, wherein the first barrier portion and the second barrier portion are angled away from the wall plane.

6. A kennel seal system comprising:
a kennel wall for a kennel, the kennel wall having a height in a vertical dimension, a thickness in a lateral dimension, and a length in a longitudinal dimension, where the vertical dimension is perpendicular to the lateral and longitudinal dimensions, and the lateral dimension is perpendicular to the longitudinal dimension;
a floor seal cap configured to engage and mount to the kennel wall, the thickness of the floor seal cap being greater than the thickness of the kennel wall;
a floor seal including a base, a first barrier flange and a second barrier flange, the base having a floor facing side and a wall facing side, the wall facing side configured to be mounted to the floor seal cap, each of the first and second barrier flanges having a proximal end and a distal end, the proximal ends of the first and second barrier flanges being coupled to the floor facing side of the base, the first and second barrier flanges being acutely angled in opposite directions with respect to the floor facing side of the base, the first and second barrier flanges being deformable to change the acute angles with respect to the base, wherein decreasing the acute angle of the first and second barrier flanges with respect to base is operative to increase a distance between the distal ends of the first and second barrier flanges.

7. The kennel seal system of claim 6, wherein the floor seal cap has a substantially inverted T-shaped cross-section.

8. The kennel seal system of claim 6, wherein the floor seal cap includes two floor-facing flanges.

9. The kennel seal system of claim 8, wherein the floor seal is coupled to the floor seal cap between the two floor-facing flanges.

10. The kennel seal system of claim 6, wherein at least one of the floor seal and the floor seal cap is substantially the same length as the kennel wall.

11. The kennel seal system of claim 6, wherein the kennel wall includes a cavity that accommodates at least a portion of the floor seal cap.

12. The kennel seal system of claim 6, wherein the first barrier flange is a mirror image of the second barrier flange.

13. The kennel seal system of claim 6, wherein the proximal ends of the first and second barrier flanges are thicker than the distal ends of the first and second barrier flanges.

14. A kennel wall seal system comprising:
a kennel wall for dividing a first kennel enclosure from a second kennel enclosure, the kennel wall having a length, a width and a height, a wall plane coplanar with the length and height of the kennel wall extending between the first and second kennel enclosures;
an extrusion configured to engage and mount to the kennel wall,
a floor seal including a base, a first barrier flange and a second barrier flange,
the base extending between the first and second kennel enclosures, the base having a floor facing side and a wall facing side, the wall facing side of the base being configured to engage and mount to the extrusion,
the first barrier flange having a first end and a second end, the first end being connected to the floor facing side of the base on the first kennel enclosure side of the wall plane, and the second end extending further towards the first kennel enclosure,
the second barrier flange having a third end and a fourth end, the third end being connected to the floor facing side of the base on the second kennel enclosure side of the wall plane, and the fourth end extending further towards the second kennel enclosure.

15. The kennel wall seal system of claim 14, wherein the width of the extrusion is at least twice the width of the kennel wall.

16. The kennel wall seal system of claim 14, wherein the extrusion has a substantially inverted T-shaped cross-section having a horizontal base and a vertical prong, the horizontal base of the inverted T-shape engaging the wall facing side of the base of the floor seal and the vertical prong of the inverted T-shape engaging the kennel wall.

17. The kennel wall seal system of claim 16, wherein the kennel wall includes a cavity that accommodates the vertical prong of the inverted T-shaped cross-section of the extrusion.

18. The kennel wall seal system of claim 14, wherein the extrusion includes two floor-facing flanges, and the wall facing side of the base of the floor seal is coupled to the extrusion between the two floor-facing flanges.

19. The kennel wall seal system of claim 14, wherein at least one of the floor seal and the extrusion has substantially the same length as the kennel wall.

20. The kennel wall seal system of claim 14, wherein the kennel wall includes a cavity that accommodates at least a portion of the extrusion.

* * * * *